United States Patent [19]
Chai et al.

[11] Patent Number: 5,343,327
[45] Date of Patent: Aug. 30, 1994

[54] RBNBB$_2$O$_6$ CRYSTAL AND ITS NONLINEAR OPTICAL DEVICES

[75] Inventors: Bruce H. T. Chai, Oviedo, Fla.; John F. H. Nicholls, Glaskow, Scotland

[73] Assignee: University of Central Florida, Orlando, Fla.

[21] Appl. No.: 147,795

[22] Filed: Nov. 5, 1993

[51] Int. Cl.$^5$ ............................................. G02F 1/35
[52] U.S. Cl. ................................. 359/330; 252/584; 359/328; 359/332; 385/122
[58] Field of Search .................... 385/122; 372/21, 22; 359/326–332; 252/584

[56] References Cited

U.S. PATENT DOCUMENTS

| | | | |
|---|---|---|---|
| 3,262,058 | 7/1966 | Ballman et al. | 359/328 X |
| 3,328,723 | 6/1967 | Giordmaine et al. | 359/330 X |
| 3,934,154 | 1/1976 | Cook, Jr. | 359/328 |
| 3,949,323 | 4/1976 | Bierlein et al. | 359/326 |
| 4,811,349 | 3/1989 | Payne et al. | 372/41 |
| 4,826,283 | 5/1989 | Chuangtian et al. | 385/122 |
| 4,841,530 | 6/1989 | Chai et al. | 372/41 |
| 5,170,460 | 12/1992 | Arvidsson et al. | 385/129 |

OTHER PUBLICATIONS

Synthesis and structure of a new multiple oxide:TINbB$_2$O$_6$, pp. 1181–1183, Laboratory of Minerology, University of Paris Jan. 9, 1974, Acta Cryst. B30.

RbNbB$_2$O$_6$: Structure., Laboratory of Minerology, University of Paris, Jan. 22, 1976, Acta Cryst., B32, pp. 2211–2215.

Primary Examiner—John D. Lee
Attorney, Agent, or Firm—Brian S. Steinberger

[57] ABSTRACT

Crystals made of RbNbB$_2$O$_6$ (RNB) crystal or any of the XYB$_2$O$_6$ family members (where X=Li, Na, K, Rb, Cs, Tl; Y=Nb, Ta, V, Sb) or related combinations in solid solutions are useful as Nonlinear Optical Devices. These crystals can produce nonlinear optical conversion effects including second harmonic generation (SHG), sum frequency generation (SFG), differential frequency generation (DFG) and optical parametric amplification (OPA). These nonlinear conversions operate on both bulk crystals and thin films including waveguide devices. RNB crystals have the advantage over prior art crystals for having better UV (ultra-violet) transparency on the order of 270 nm.

15 Claims, 7 Drawing Sheets

RBNBB$_2$O$_6$ CRYSTAL AND ITS NONLINEAR OPTICAL DEVICES

This invention was funded in part under contract #N00014-93-1-0664 from the Office of Naval Research.

This invention relates to Nonlinear Optical Devices, and in particular to creating nonlinear optical type devices such as waveguides made of RbNbB$_2$O$_6$ (RNB) crystals or any of the XYB$_2$O$_6$ family members (where X=Li, Na, K, Rb, Cs, Tl; Y=Nb, Ta, V, Sb) or related combinations in solid solutions.

BACKGROUND AND PRIOR ART

Nonlinear optical devices have required a non-centrosymetric crystal which has non-zero components of the second order polarizability tensor. Under intense laser radiation of suitable wavelength the crystal can produce nonlinear optical effects such as second harmonic generation (SHG), sum frequency generation (SFG), difference frequency generation (DFG) and optical parametric amplification (OPA), via the $\chi^{(2)}$ type nonlinear process. Devices utilizing these effects have been described in U.S. Pat. Nos. 3,262,058 and 3,328,723.

The nonlinear optical conversion efficiency of the SHG process at moderate input laser power is given by:

Formula (1)

$$\eta = (I_{2\omega}/I_\omega) = C*L^2*[d_{eff}]^2*I_\omega*\text{sinc}^2[\Delta kL/2] \qquad (1)$$

where
 $I_{2\omega}$ = intensity of second harmonic wave
 $I_\omega$ = intensity of fundamental wave
 $d_{eff}$ = the effective value of nonlinear susceptibility
 L = length of crystal
 C = constant term
 $\Delta k$ = phase mismatch = $k_{2\omega} - 2k_\omega$ This linear relationship is valid when only a small amount of the incident radiation is converted to a different wavelength. When the phase mismatch between the two waves is $\pi$ the conversion efficiency is zero. The length of crystal over which this happens is referred to as the coherence length, and is typically of the order of 20 $\mu$m. Maximum conversion efficiency is obtained when the phase matching condition is achieved where $\Delta k=0$ and sinc($\Delta kL/2$)=1. In this situation the second harmonic and fundamental waves stay in phase as the fundamental propagates in the crystal and the conversion efficiency is proportional to $L^2$. Phase matching is realized when the refractive index of the fundamental and second harmonic waves are equal and is therefore only allowed in birefringent crystals.

Two types of phase matching have been used. Type I is where the two fundamental waves are of the same polarization; and Type II where the two fundamental waves are of orthogonal polarization.

Four techniques can be employed to achieve phase matching (see U.S. Pat. No. 3,949,323, which is incorporated by reference). In the most commonly used angle tuning method the nonlinear crystal is rotated to obtain phase matching. Temperature and pressure tuning may also be introduced as well as application of stress.

Practical applications in nonlinear devices using the angle tuning method are restricted by the walk-off effect. Double refraction causes a difference in the propagation direction and direction of energy propagation for the extraordinary wave. The result is a separation of the fundamental and second harmonic waves with propagation through the crystal. The walk-off angle is described by:

Formula (2)

$$\tan(\rho) = (n_{\omega o}/2)*\{1/(n_{2\omega e})^2 - 1/(n_{2\omega o})^2\}*\sin(2\theta) \qquad (2)$$

where
 $n_{\omega o}$ = refractive index if the ordinary fundamental wave
 $n_{2\omega o}$ = refractive index of the ordinary second harmonic wave
 $n_{2\omega e}$ = refractive index of the extraordinary second harmonic wave
 $\theta$ = phase matching angle relative to the optic axis (for uniaxial crystals)

A second limiting effect is phase mismatch resulting from the divergence of the incident fundamental laser beam. Phase mismatch is interpreted in terms of the acceptance angle, which describes the deviation angle about the phase matching direction where the intensity of the second harmonic is one half the maximum intensity. The half width angular acceptance angle is given by:

Formula (3)

$$\delta\theta_{\frac{1}{2}} = \lambda_\omega/(L[n_{2\omega o} - n_{2\omega e}]*\sin 2\theta) \qquad (3)$$

where
 $\lambda_\omega$ = wavelength of the fundamental wave
 L = crystal length Formula (2) shows that minimum walk-off occurs when $\theta=90°$, i.e. when the propagation direction is in a plane perpendicular to the optic axis. Similarly, the largest angular acceptance occurs at this angle, where the second harmonic intensity is most insensitive to angular deviations. The situation where $\theta=90°$ is referred to as the non-critical phase matching (NCPM) condition. NCPM is possible when the natural dispersion of the nonlinear crystal offsets the birefringence. Temperature tuning can be utilized to achieve NCPM when the phase matching angle is close to 90°, as in crystals with small birefringence.

For optically biaxial crystals phase matching is described in terms of both $\theta$ and $\phi$ which are polar angles of the propagation direction of the fundamental wave. Acceptance angles are measured in both $\theta$ and $\phi$ and the smallest is conventionally defined as the limiting acceptance angle of the nonlinear crystal.

At present, there are several crystals commonly used in nonlinear optical devices. KH$_2$PO$_4$ (KDP), (NH$_2$)$_2$CO (Urea), KTiOPO$_4$ (KTP), LiNbO$_3$, and more recently the borate crystals BaB$_2$O$_4$ (BBO) and LiB$_3$O$_7$ (LBO). Each class of crystals have advantages but also disadvantages. KDP and Urea are hygroscopic(water soluble) and have small acceptance angles. KTP and LiNbO$_3$ show relatively large nonlinearity but are unable to phase match in the UV region and the damage threshold is low. Both the borates are capable of producing harmonics in the deep UV but their $d_{eff}$ is very small. RbNbB$_2$O$_6$ (RNB) and its related isomorphs may overcome some of the shortcomings of those materials.

The crystal structure of RNB was first reported in Mat. Res. Bull. 10, 469, (1975). It was assigned to orthorhombic Pnm2$_1$ space group with the mm2 point group. One year later, the same authors made correction in Acta. Cryst. B32, 2211 (1976) to reassign it being monoclinic and space group Pn. The lattice parameters were respectively for a=3.928×5 Å, b=9.449 Å and c=7.389 Å, $\alpha$=90.00° and Z=10 in each unit cell. RNB was synthesized accidently in very small (sub-milimeter) size of crystal. These authors made no reference to the potential nonlinear optical properties of the crystal or the related isomorphs. The current inventors were the first to grow sizable high quality single crystals and the first to use these RNB crystals to demonstrate nonlinear optical behavior.

SUMMARY OF THE INVENTION

The first objective of the present invention is to provide a nonlinear optical device capable of converting incident laser radiation with high power density and large divergence into its harmonics achieving high conversion efficiency.

The second object of this invention is to provide a nonlinear optical device capable of producing harmonics in the UV region of the spectrum.

The third object of this invention is to produce a waveguide device that can convert incident radiation into its harmonics.

The fourth object of this invention is to provide a device capable of producing coherent harmonics in the 3 $\mu$m infra-red region.

The fifth object of the invention is to provide a slab NLO device of large cross section for generation of second and third harmonics of the Nd:YAG laser radiation.

The crystals developed are made of RbNbB$_2$O$_6$ (RNB) crystal or any of the XYB$_2$O$_6$ family members (where X=Li, Na, K, Rb, Cs, Tl; Y=Nb, Ta, V, Sb) or related combinations in solid solutions are useful as Nonlinear Optical Devices. These crystals can produce nonlinear optical conversion effects including second harmonic generation (SHG), sum frequency generation (SFG), differential frequency generation (DFG) and optical parametric amplification (OPA). These nonlinear conversions operate on both bulk crystals and thin films including waveguide devices. RNB crystals have the advantage over prior art crystals for having better UV(ultra-violet) transparency on the order of 270 nm.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
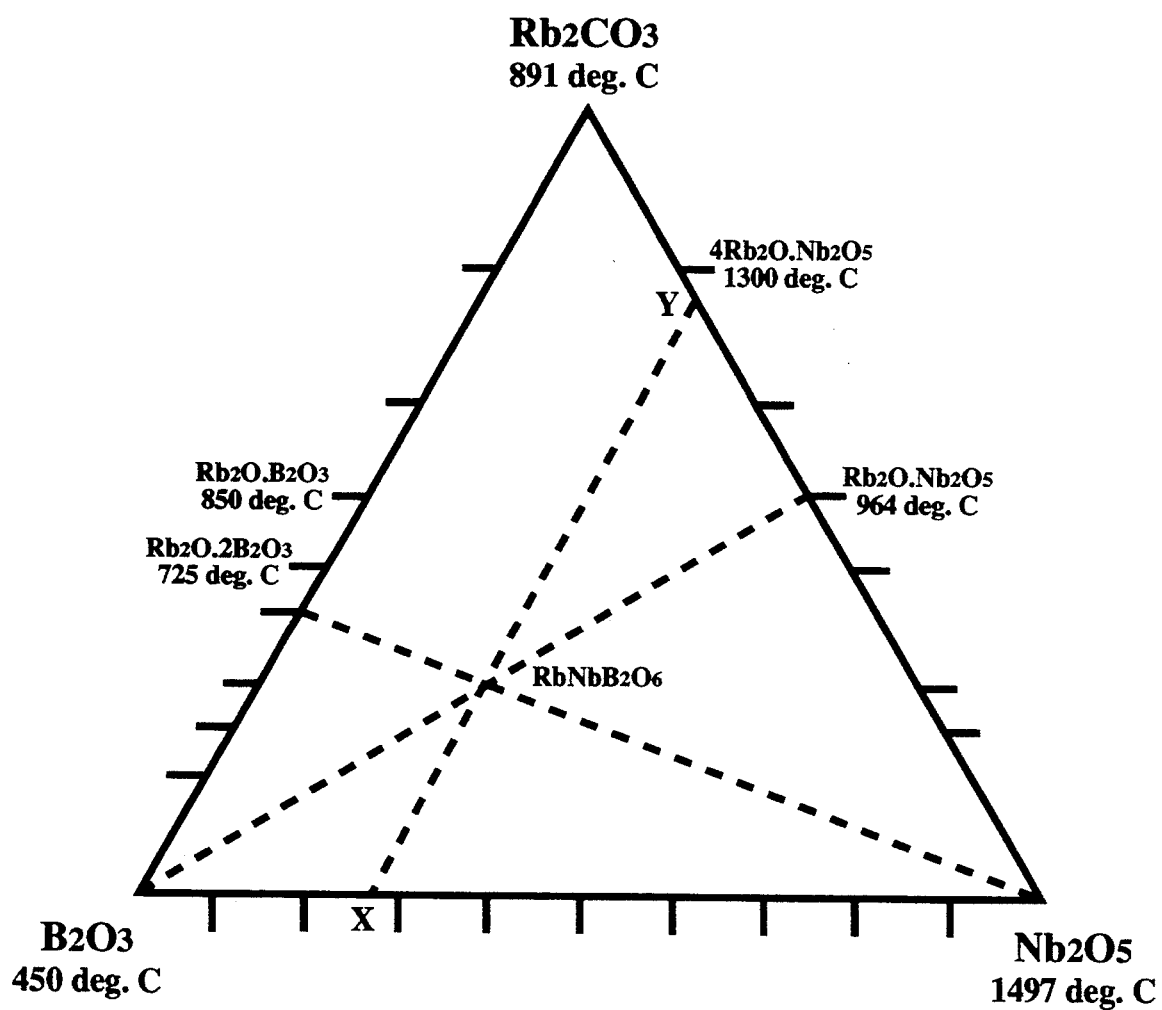
FIG. 1 shows the ternary phase diagram of the system Rb$_2$O-B$_2$O$_3$-Nb$_2$O$_5$.
Figure 2:
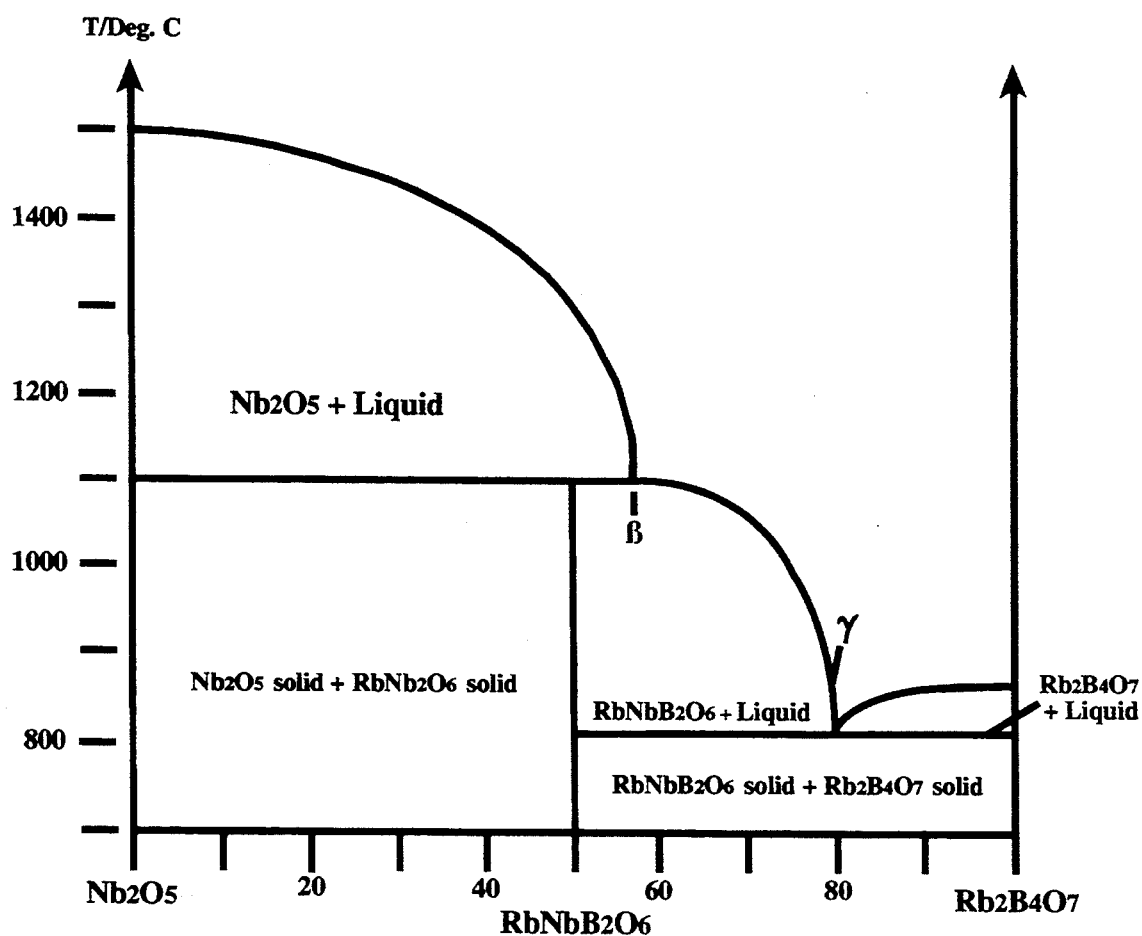
FIG. 2 illustrates the pseudo-binary phase diagram used for the growth of RNB.

NLO devices can be created utilizing the single crystals of RNB and its isomorphs. The crystal RNB was grown using the top seeded high temperature solution growth (HTSG) method. This is the first time that the ternary phase diagram for the system Rb$_2$O-B$_2$O$_3$-Nb$_2$O$_5$ is established. FIG. 1 shows that RNB is the only ternary phase in the system. Experiments in our lab has shown that RNB melts incongruently at a temperature of approximately 1100° C. We found that the ternary RNB phase may be grown using a variety non-stoichiometric compositions, in several pseudo-binary systems. Nevertheless, we found that the optimum RNB growth system is Rb$_2$B$_4$O$_7$-Nb$_2$O$_5$ with an excess of Rb$_2$B$_4$O$_7$. This pseudo-binary system is illustrated in FIG. 2, where the RNB phase may be precipated from a solution with a composition range between the points $\beta$ and Y. Large single crystals of dimensions 30×20×10 mm$^3$ were produced for the first time. They are large enough for nonlinear device applications. Unlike other borate crystal systems such as LBO and BBO, the XYB$_2$O$_6$ ternary systems have no tendency to form glass. We attribute this to the low melt viscosity in these systems. This fact in conjunction with high transparency of the solution suggests that growth is less problematic with the XYB$_2$O$_6$ family, and higher quality crystals may be obtained.

To thoroughly investigate the XYB$_2$O$_6$ family, we have successfully grown single crystals of several of the isomorphs of RNB by the high temperature solution growth (HTSG) method. We synthesized and grew two previously unknown phases: KNbB$_2$O$_6$ (KNB) and KTaNbB$_2$O$_6$ (KTNB). Other single crystals grown include: RbTaB$_2$O$_6$ (RTB), CsNbB$_2$O$_6$ (CNB), Rb$_{1-x}$K$_x$NbB$_2$O$_6$ (RKNB), Rb$_{1-x}$Na$_x$NbB$_2$O$_6$ (RNNB), Cs$_{1-x}$K$_x$NbB$_2$O$_6$ (CKNB) and K$_{1-x}$Na$_x$NbB$_2$O$_6$. Solid solution was also found to exist in the system XNb$_{1-x}$Ta$_x$B$_2$O$_6$, where X=Na, K, Rb, Cs, Tl. We observed no phase transitions in the XYB$_2$O$_6$ family of compounds from RT to dissociation temperature.

We were the first to recognize and demonstrate that RNB and its isomorphs are capable of nonlinear optical $\chi^{(2)}$ and $\chi^{(3)}$ type processes. Our detailed X-ray structural analysis has shown that RNB is indeed monoclinic with space group Pn, with unit cell parameters: a=3.937(4)×5 Å, b=7.7401(1) Å, c=9.468(2) Å, $\alpha$=90.02(2) with Z=10, V=1379.43 Å$^3$. The calculated density is 3.563 g/cm$^3$. Our X-ray data is significantly different from the previous publications [Acta Cryst. B32, 2211 (1976)]. The crystal is optically biaxial and the true point group is C$_2$. Since $\alpha$ is essentially 90°, the crystal can be considered as pseudo-orthorhombic, with point group C$_{2v}$(mm2). Unlike other borate materials employed in nonlinear optical devices, RNB and its isomorphs have a very wide optical transparency, especially in the infra-red region. We also are the first to discover that RNB and its isomorphs are transparent between 275 nm and 3.5 μm.

For a single crystal with pseudo orthorhombic symmetry, the non-zero components of the second order polarizability tensor are: $d_{15}$, $d_{24}$, $d_{31}$, $d_{32}$ and $d_{33}$. Thus far, we have determined these coefficients and the $d_{eff}$ of the second harmonic process, at a fundamental wavelength of 1.064 μm using three different methods. Using the Kurtz test, the value of $d_{eff}$ in RbNbB$_2$O$_6$ was measured to be 5× $d_{eff}$(KDP). Under the Kurtz test, crystals are ground into a powder and sifted through a seive. The particles are then shot with a laser and looked at with a second harmonic light. The results are analyzed with a photo detector. Detailed evaluation of the individual components involves the Maker fringe technique to see the amount of phase shifting. We found that $d_{32}=2.4$ pmV$^{-1}$; $d_{33}=9$ pmV$^{-1}$ and $d_{24}=2.4$ pmV$^{-1}$. The value of $d_{eff}$ has also been measured using direct phase matching techniques. These d-values are larger than those of LBO. We recognized that the crystal RNB would possess large d-coefficients within and perpendicular to the b-c (boron-oxygen group plane), overcoming the major deficiency of β-BBO. The nature of the d-coefficients is indicative of the structure, which combines two types of nonlinear optical units: the Nb-O$_6$ octahedra and the planar (BO$_3$) asymmetric groups.

Figure 3:
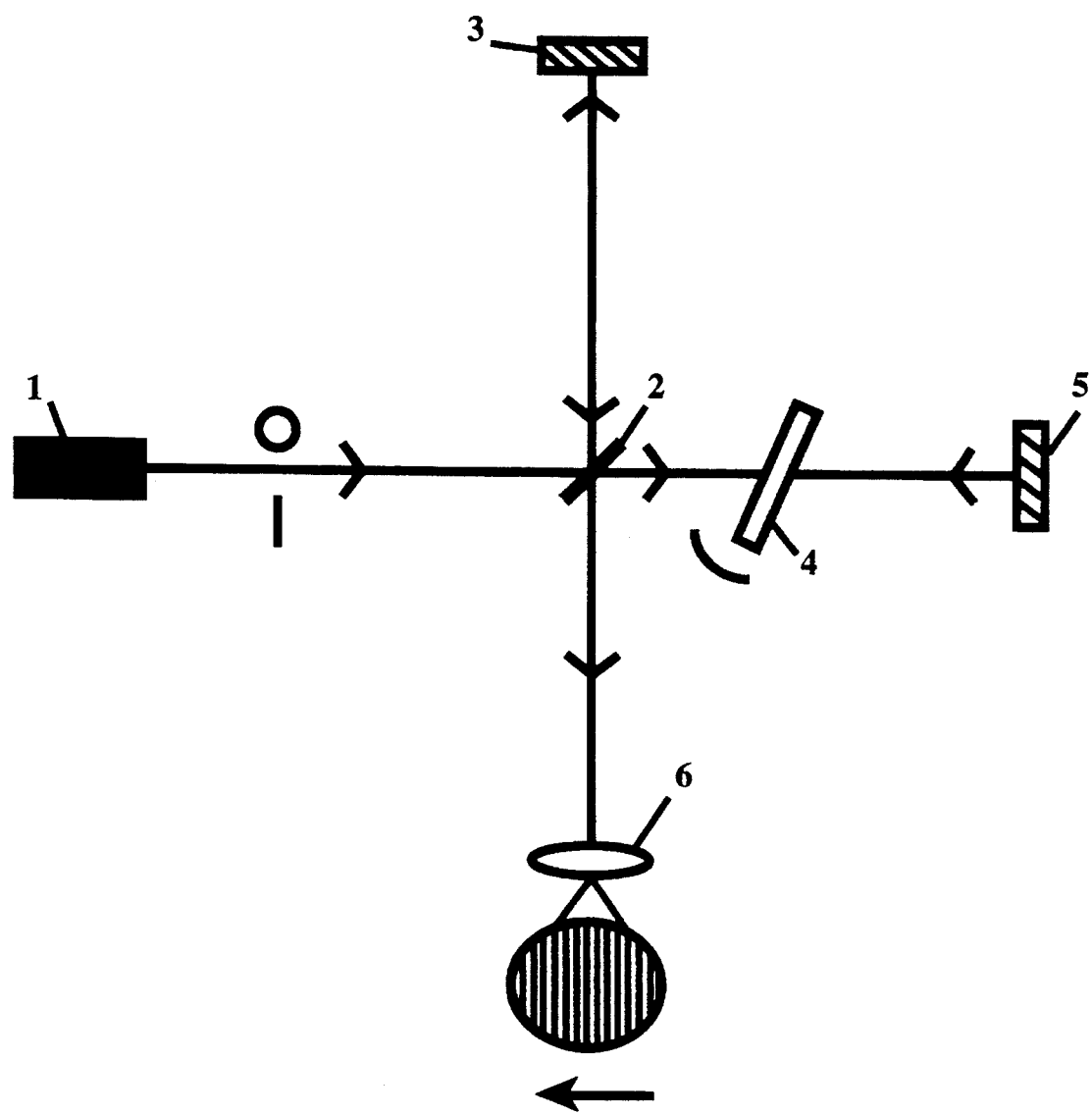
FIG. 3 illustrates a schematic of the experimental configuration.
Figure 4:
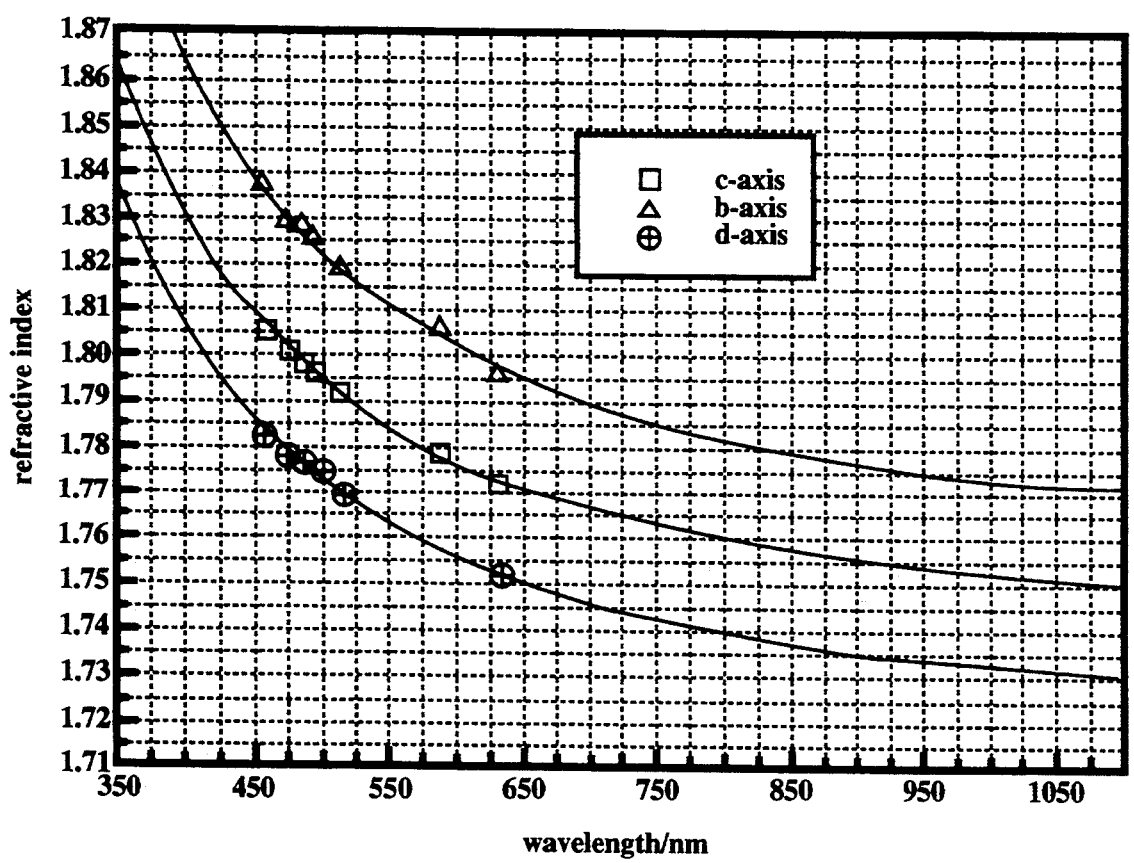
FIG. 4 shows the dispersion effects of the preferred crystal, RNB.

FIG. 3 shows a schematic of the experimental configuration employed to determine the index of refraction of RNB. The measurement technique is based on a polarized Michelson interferometer, making use of the natural birefringence of the RNB crystal to measure all three principal indices from a single (100) cut. Polarized radiation from the laser, which can be any visible source, is amplitude divided at the beam splitter (2). The transmitted wave passes through the RNB crystal (4) and is retroreflected at the mirror (5). The reference of the interferometer wave is retro-relected at mirror (3) and interferes with the other wave at the beamsplitter. Operation of the device is based upon the precise path length change introduced as the crystal rotates. The corresponding path difference, determined by the refractive index and angle of rotation, is monitored by observing the interference pattern imaged by the lends(6). The refractive indices of the in-plane b and c crystallographic axes are measured using vertically polarized light, while $n_a$ is deduced from the value of $n_b$ or $n_c$ using horizontally polarized light. Sellmier equations describing the normal dispersion of refractive index for the three principle refractive indices conformed to a two harmonic oscillator model. The dispersion relationships were obtained by regression analysis and are described by the equations:

$$n_a^2 = 1 - 096\lambda^2/(\lambda^2 - 4.941 \times 10^3) + 1.678\lambda^2/(\lambda^2 - 1.056 \times 10^4)$$

$$n_b^2 = 1 - 1.31\lambda^2/(\lambda^2 - 5.484 \times 10^3) + 2.07\lambda^2/(\lambda^2 - 1.116 \times 10^4)$$

$$n_c^2 = 1 + 1.16\lambda^2/(\lambda^2 - 1.634 \times 10^4) - 0.422\lambda^2/(\lambda^2 - 1.369 \times 10^4)$$

where λ is given in nm. The dispersion of RNB is shown in FIG. 4. The vertical axis of the graph is the dispersion index, while the horizontal axes depicts the wavelength in nm.

The birefingence of RNB is approximately 0.04, which is quite small. Considering the small birefringence of this nonlinear optical crystal and the nature of the optical dispersion, it is obvious that if there is phase matching it shall occur close to the NCPM orientation. Therefore the acceptance angle is very large. We achieved direct type I phase matching with a 1.5 mm thick (011) orientation of RNB, using a Nd:YAG laser operating at a fundamental wavelength of 1.064 μm. Angle tuned critical phase matching was observed, with a large angular acceptance.

Figure 5:
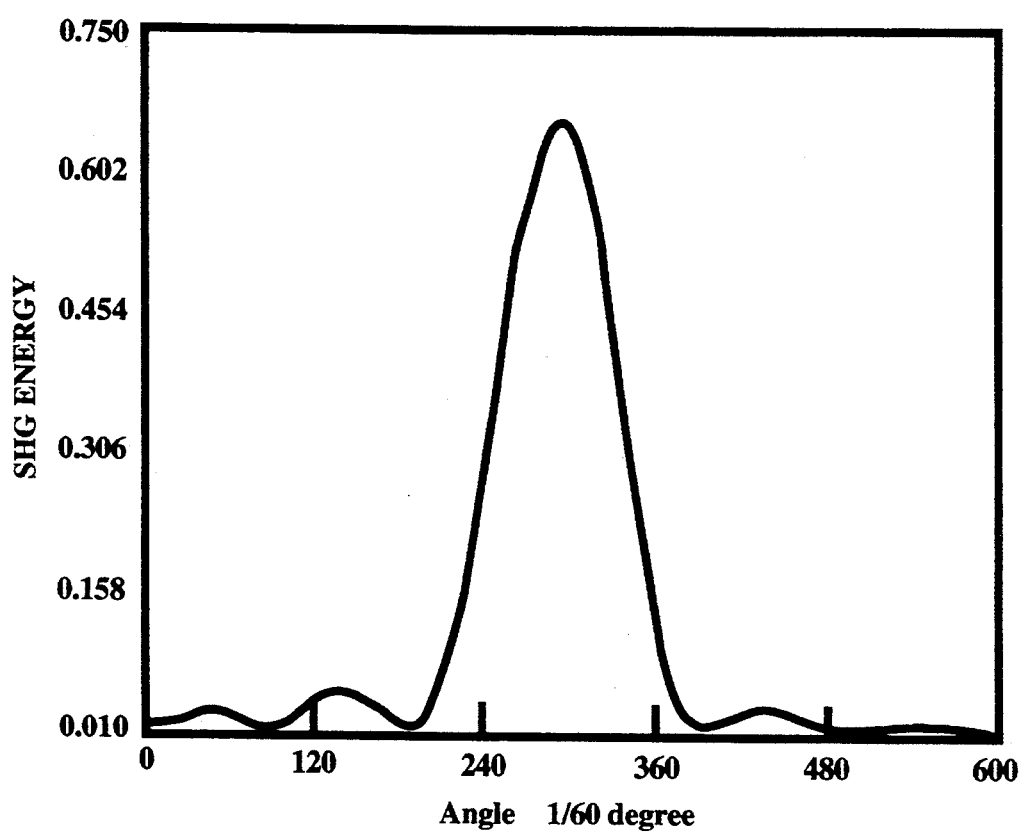
FIG. 5 shows the angular dependence of second harmonic intensity in the RNB crystal.

FIG. 5 shows the angular dependence of second harmonic intensity in the RNB crystal. Using a plane laser wave, the angular acceptance of the critically phase matched crystal was measured to be 30 mrad. This is larger than any other technologically important crystal, even LBO. Similarly, the walk-off between the fundamental and second harmonic is very small in RNB.

Using a mode locked, Q-switched Nd:YAG laser λ=1.064 μm, we measured the damage threshold of RNB to be 8 GW/cm$^2$ at 6.5 ns pulse width, and 60 GW/cm$^2$ at 23.7 ps pulse width. This is approximately 40 times larger than KDP under the same experimental conditions. Obviously, the nonlinear optical crystal RNB can be applied as a nonlinear converter in high average power laser systems, as required for laser induced fusion.

The wide transparency of RNB and its isomorphs means that the crystal can be employed in 3 μm OPO devices, unlike other borate materials. In addition, the UV absorption edge is blue shifted approximately 70 nm relative to other nonlinear niobates and titanates such as KTP. These results show that RNB and its isomorphs have the combined attractive properties of nonlinear borates and niobates/titanates, while accommodating for the deficiencies in these materials.

By considering the crystal structure, we also recognized that RNB can be an excellent candidate to produce nonlinear, channel waveguides similar to that produced in KTP. The alkali ions form channels in the a-axis direction (using the orthorhombic convention). We have demonstrated the substitution of K ions in RNB lattice. KNB has been shown to have different refractive indices than RNB, and a perfect waveguide structures can be produced by ion-exchange methods. We also expect that the UV absorption edge can also be shifted by the substitution of Ta for Nb, as observed in the case of LiNbO$_3$ and LiTaO$_3$.

We also immersed all the XYB$_2$O$_6$ type crystals, grown in the laboratory, in water and observed no surface degradation. This result demonstrates that RNB and its isomorphs are non-hygroscopic and chemically stable. Therefore, nonlinear optical devices using RNB can expose to ambient without the need of protection.

Figure 6:
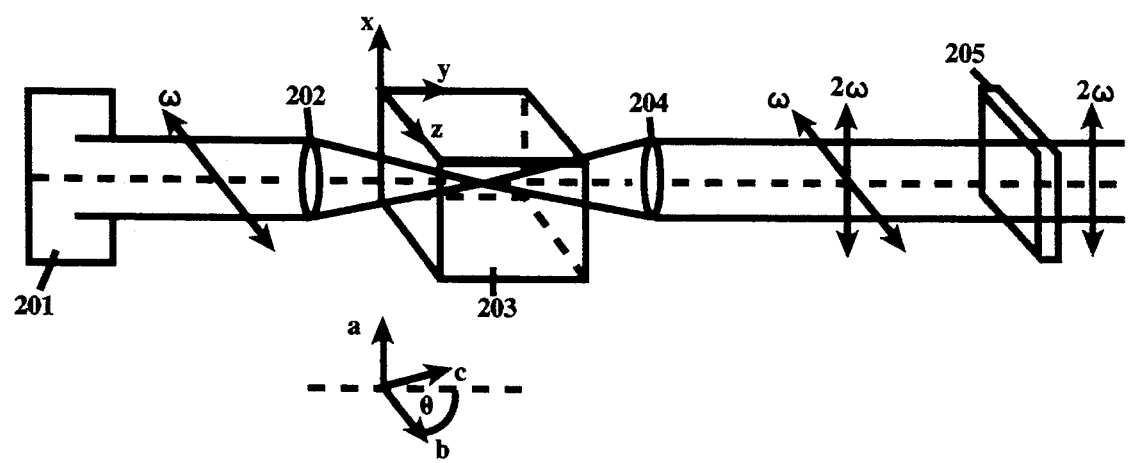
FIG. 6 illustrates the principal of angle tuned, critical phase matching with single crystals of RNB or its isomorphs, at room temperature.

FIG. 6 illustrates the principal of type 1, angle tuned, critical phase matching second harmonic generation in the RNB crystal. Horizontally polarized fundamental from laser source 200 is focussed by lens 202 into the RNB crystal 203, where the passive nonlinear interaction generates a coherent vertically polarized second harmonic wave, with twice the frequency of the fundamental. The divergent waves are collected by lens 204 and pass through filter 205 which transmits only the second harmonic wave. For the nonlinear crystal RNB, phase matching is allowable over a range of θ & φ, where φ and θ are the angles between the direction of propagation and the x and z axes respectively. We calculate the phase matching loci based on the dispersion curves and show that phase matching can occur in both the x-y (a-c) and z-y planes. From these results, larger $d_{eff}$ is obtained for the fundamental propagation in the y-z plane ($\phi=90$), at $\lambda=1.064$ μm. With the RNB nonlinear crystal maximum fundamental tuning range is obtained by propagating the fundamental, as shown in FIG. 4, almost in the y-axis direction. This configuration utilizes all the birefringence of the material in the type I interaction, where the focussed fundamental of a Nd:YAG incident on the RNB crystal is planar polarized. The generated second harmonic is horizontally polarized parallel to the x(a)-axis. Emergent light is collected by a lens, but the removal of this lens does not affect the workings of the device. The phase matching angle $\theta_m$ is calculated from the formula:

$$n_{2\omega x}=n_{\omega z}(\theta_m)$$

$$\sin^2\theta_m = \{(n_{2\omega x})^{-2}-(n_{\omega z})^{-2}\}\cdot\{(n_{\omega y})^{-2}-(n_{\omega z})^{-2}\}^{-1}$$

where $n_{2\omega x}$, $n_{\omega z}$ and $n_{\omega y}$ can be obtained from the dispersion relations. We calculate for SHG in RNB, at a fundamental wavelength of 1.064 μm, provided a value of $\theta_m=63°$ with $\phi=90°$. Critical phase matching was achieved using (010) and (011) crystallographic orientation of RNB. Angle tuned critical phase matching can also be achieved in the isomorphs of the nonlinear material.

Figure 7:
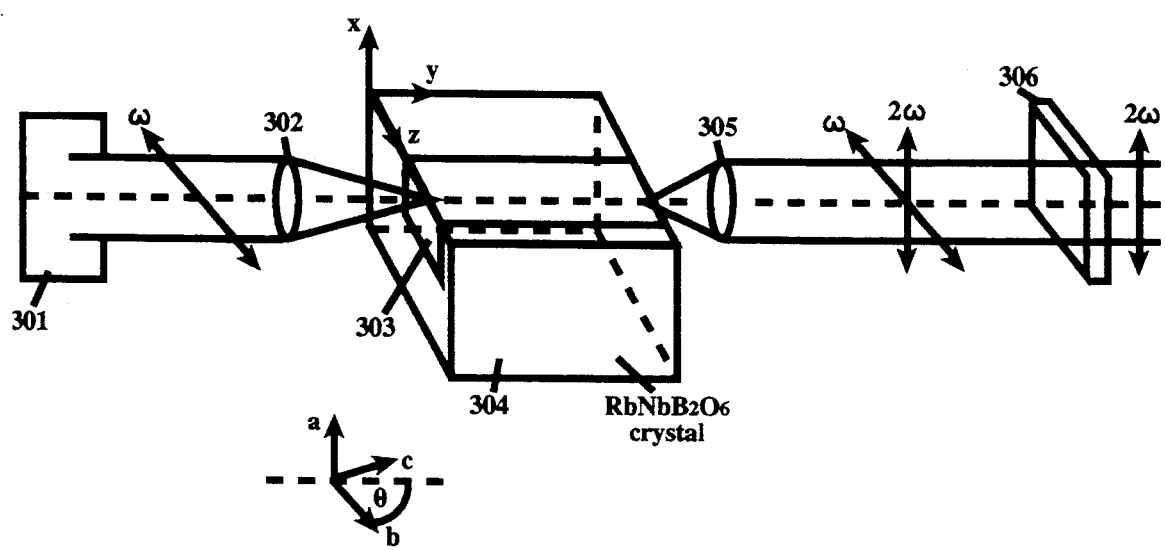
FIG. 7 illustrates the principle of a nonlinear waveguide operation using a single crystal of RNB or its isomorphs.

In FIG. 7 a waveguide 303 of $Rb_{1-x}A_xNbB_2O_6$, where A=Na, K, Cs, Tl and x is between 0.1 to 0.9, exists on the RNB single crystal substrate 304. Other members of the $XYB_2O_6$ family, such as KNB, may be also used as the single crystal substrate of the device. The waveguide may be produced by a variety of methods, such as ion exchange or ion implantation. The orientation of the waveguide is conveniently the same as for bulk phase matching owing to the Rb channels parallel to the a(x) - axis, using the orthorhombic basis. The device operates in the following way. A fundamental wave of the Nd:YAG laser 301 at 1.064 μm, horizontally polarized in the y-z plane, is focussed by a lens 302 and then propagates in the $Rb_{1-x}A_xNbB_2O_6$ waveguide 303, at an angle $\theta$ to the z-axis, where the phase matched SHG is generated. As shown, the SHG wave is polarized perpendicular to the fundamental, parallel to the x-axis. The emergent light is collimated by a collection lens 304 and passed through a filter 305 to separate the second harmonic and fundamental.

METHOD OF MANUFACTURING

The growth and processing of $RbNbB_2O_6$ single crystals was as follows. A homogeneous mixture 65% $Rb_2B_4O_7$ and 35% $Nb_2O_5$ was charged in a Pt crucible 75 mm in height, with a diameter of 75 mm. This growth composition is located on the liquidus of the RNB ternary phase at a composition between the points β and Y shown on the pseudo-binary phase diagram in FIG. 2. This is the first time any pseudo-binary phase analysis has been performed for RNB in the $Rb_2O$-$B_2O_3$-$Nb_2O_5$ system. The mixture was placed in a tubular resistance heated furnace with an opening at the top for seeding. After rapid heating in an atmosphere of air, the charge was sustained at a temperature of 1150° C. for at least 24 hours. The furnace was then cooled to a temperature of 1050° C. over 5 hours. After a period of equilibration, a single crystal seed, either with (011) or (100) orientation, was translated slowly into the furnace. The seed, grown by the inventors using spontaneous nucleation, was kept in contact with the solution surface during growth. The growth of single crystal $RbNbB_2O_6$ was initiated by cooling the solution at a rate of 2°-5° C./day, until the eutectic temperature at approximately 900° C. Before cooling to room temperature over 2 days, the single crystal was separated from the solution surface. The transparent single crystals grown are typically of dimensions $20\times20\times10$ mm$^3$. The other isomorphs of RNB can be grown in the same way, though at slightly modified temperatures.

We have also grown $RbNbB_2O_6$ and its isomorphs using other starting compositions, utilizing the finite ternary field of the phase. In addition, we have successfully grown single crystals of RNB with excess amounts of $B_2O_3$ to increase the size of the metastable region. Other modifications to the starting composition have been assessed. We have found that adding excess amounts of LiF or KF can reduce the viscosity of the solution.

Using the procedure above, a single crystal of $RbNbB_2O_6$ was obtained with the (011) orientation. The crystal was placed in the experimental configuration shown in FIG. 6. Angle tuning was employed to convert the focussed radiation of a Q-switched, mode locked Nd:YAG laser, operating at 1.064 μm, into coherent radiation at 532 nm via a critically phase matched, type I, SHG nonlinear interaction. The fundamental beam, of duration 10 ns with energy 140 μJ/pulse, was focussed to a waist of 80 μm and a conversion efficiency of 10% was obtained.

Clearly, the nonlinear optical crystal RNB and its isomorphs are capable of producing other types of nonlinear interaction. Devices such as up and down converters and optical parametric oscillators, utilizing the $\chi(2)$ nonlinear process, can be obtained by appropriate design and crystal fabrication. Similarly, third and fourth harmonic generation are also feasible using the $XYB_2O_6$ family of compounds. Such devices are of course not beyond the scope of this invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A nonlinear optical device comprising means to direct at least one incident beam of electromagnetic radiation into at least one crystal possessing nonlinear properties whereby electromagnetic radiation emerging from the same crystal contains at least one frequency different from the frequency of any incident beam of radiation, wherein the crystal comprises:
   a single crystal of $RbNbB_2O_6$.

2. A nonlinear optical device of claim 1, wherein the crystal is:
   a waveguide device.

3. A nonlinear optical device of claim 1, wherein the crystal is
   an up and down converter.

4. A nonlinear optical device of claim 1, wherein the crystal is:
   a parametric oscillator.

5. A nonlinear optical device of claim 1, wherein the crystal is:

grown by top seeding or submerging in a high temperature growth solution.

6. A nonlinear optical device comprising:
a crystal of $A_{1-x}B_xC_{1-y}D_yB_2O_6$, where A is selected from the group consisting of Li, Na, K, Rb, Cs, and Tl; B is selected from the group consisting of Li, Na, K, Rb, Cs, Tl, Mg, Ca, Sr, Ba; C is selected from the group consisting of Nb, Ta, V, Sb; D is selected from the group consisting of Nb, Ta, V, Sb, and Ti, and wherein $0<x<1$ and $0<y<1$.

7. A nonlinear optical device of claim 6, wherein the crystal is:
a waveguide device.

8. A nonlinear optical device of claim 6, wherein the crystal is:
an up and down converter.

9. A nonlinear optical device of claim 6, wherein the crystal is:
a parametric oscillator.

10. A nonlinear optical device of claim 6, wherein the crystal is:
grown by top seeding or submerging in a high temperature growth solution.

11. A nonlinear optical device comprising means to direct at least one incident beam of electromagnetic radiation into at least one crystal possessing nonlinear properties whereby electromagnetic radiation emerging from the same crystal contains at least one frequency different from the frequency of any incident beam of radiation, wherein the crystal comprises:
a single crystal of $XYB_2O_6$, where X is selected from the group consisting of Li, Na, K, Rb, Cs, and Tl; and Y is selected from the group consisting of Nb, Ta, V and Sb.

12. A nonlinear optical device of claim 11, wherein the crystal is:
a waveguide device.

13. A nonlinear optical device of claim 11, wherein the crystal is:
an up and down converter.

14. A nonlinear optical device of claim 11, wherein the crystal is:
a parametric oscillator.

15. A nonlinear optical device of claim 11, wherein the crystal is:
grown by top seeding or submerging in a high temperature growth solution.

* * * * *